June 21, 1927.
J. M. SELDEN
1,633,499
POULTRY TRUSSING DEVICE
Filed March 6, 1925
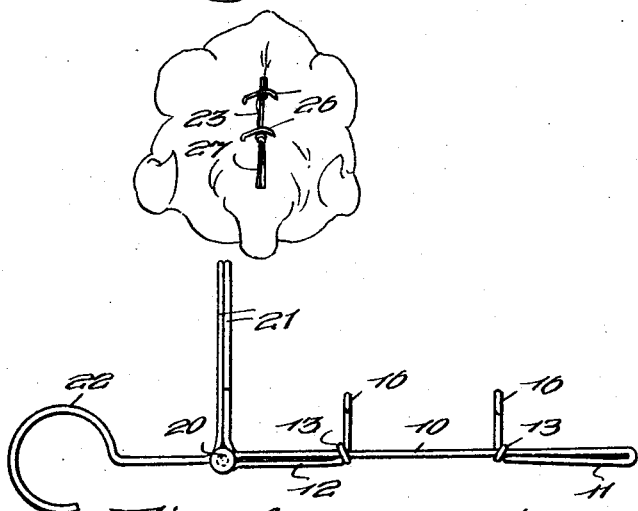
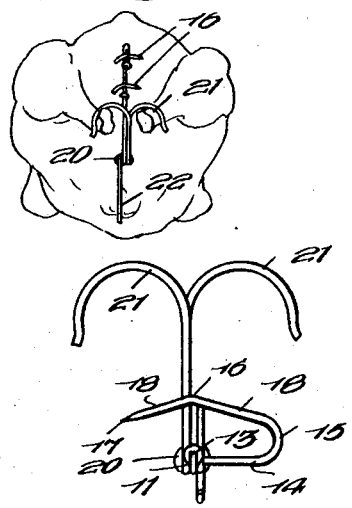
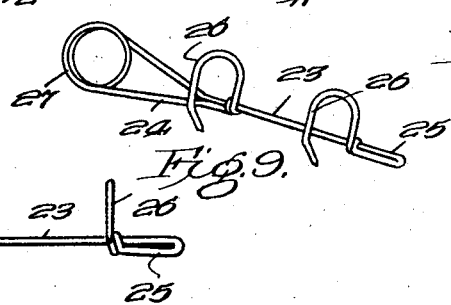
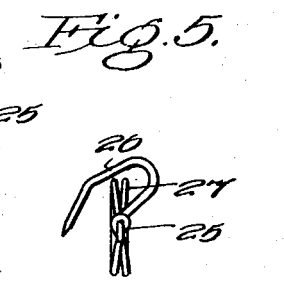
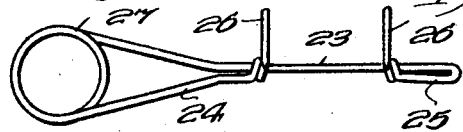
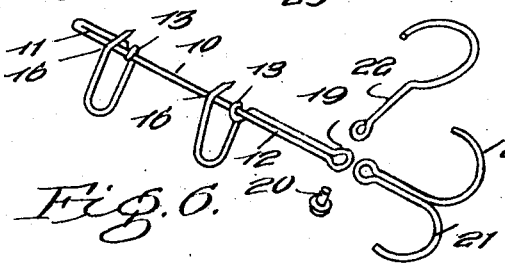
Inventor
James M. Selden Patented June 21, 1927.

1,633,499

UNITED STATES PATENT OFFICE.

JAMES M. SELDEN, OF PITTSBURGH, PENNSYLVANIA.

POULTRY-TRUSSING DEVICE.

Application filed March 6, 1925. Serial No. 13,539.

The present invention relates to devices for holding closed the openings in dressed poultry during roasting thereof, and is generally of the type disclosed in my prior Patent, No. 1,123,019, granted December 29, 1914.

The primary object is to provide a simple article that can be inexpensively produced and will effectively perform the desired functions.

In the accompanying drawings:

Figure 1 is a perspective view of a dressed fowl, showing two embodiments of the invention in operative position thereon.

Figure 2 is a front view of the fowl as trussed,

Figure 3 is a rear view of the same fowl.

Figure 4 is a side elevation of the device for closing the rear opening,

Figure 5 is an end elevation of the same.

Figure 6 is a perspective view of the device shown in Figures 4 and 5, but with the elements in separated condition, Figure 7 is a side elevation of the device used for closing the breast of the fowl, Figure 8 is an end elevation of the same, Figure 9 is a perspective view thereof.

Considering first the form of construction utilized for closing the rear opening, the body thereof is formed of a single piece of wire, the main portion constituting a shank 10, the end portions of which are doubled back, as shown at 11 and 12 respectively, forming doubled terminals for the shank. These end portions are coiled or twisted, as shown at 13 about the main portion of the wire and the terminals are formed into hooks. These hooks comprise base portions 14 extending in one direction from the shank and terminate in bights 15, from which bights project bills 16 that extend in the opposite direction to the base 14 and across the shank. The free terminals are pointed, as shown at 17. These bills, it will be noted, have angularly disposed portions 18.

The doubled part 12 at one end is formed with a terminal eye 19, through which passes a pivot rivet 20, on which are mounted a pair of oppositely extending leg-holding hooks 21 formed of a single wire, as clearly shown in Figure 6. Another hook 22, formed of wire, is also pivoted on the rivet, and is adapted to swing to a position in reverse relation to the doubled hooks 21.

In using the device the hooks 14—18 are engaged through the skin of the fowl on opposite sides of the rear opening by turning the shank, after which the doubled hooks 21 are engaged with the legs and the single hook 22 is engaged under the tail. This securely trusses the fowl, not only closing the opening, but holding the legs in depressed position. In this connection, it has been found that the extension 11 constitutes a relatively broad bearing that prevents its sinking into the fowl, due to the outward pull of the legs.

For the purpose of closing the front opening, the device illustrated in Figures 1, 2 and 7, 8, and 9 is employed. This is also formed of a single wire, and comprises a shank 23, with the ends doubled back, as shown at 24 and 25, the terminal portions being formed into transverse hooks 26 corresponding in shape and utility to the hooks 14—18 of the above device. One of the doubled portions 24 is coiled into an enlarged eye 27, by which the device can be readily handled. This device in so far as its closing and holding action is concerned, operates the same as the first described member.

From the foregoing, it is thought that the construction, operation and many advantages of the herein described invention will be apparent to those skilled in the art, without further description and it will be understood that various changes in the size, shape, proportion and minor details of construction, may be resorted to without departing from the spirit or sacrificing any of the advantages of the invention.

What I claim, is:

1. A device for trussing poultry, comprising a shank and a holding hook extending laterally from one side of the shank and with its free end projecting in the opposite direction and located beyond the opposite side of said shank.

2. A device for trussing poultry, comprising a shank and a holding hook extending laterally from one side of the shank and with its free end projecting in the opposite direction transversely of the shank, said hook having an inwardly tapered bight.

3. A device for trussing poultry, comprising a shank and a holding hook extending laterally from one side of the shank and with its free end projecting in the opposite direction transversely of the shank and beyond the same, said free end portion comprising angularly disposed parts.

4. A device for trussing poultry formed of a wire having its main portion constituting a shank and its end portions formed into trussing hooks that have their bases extending in one direction laterally from the shanks and their free ends extending in the opposite directions across the shank.

5. A device for trussing poultry formed of a wire having its main portion constituting a shank and its end portions doubled back to form bearing ends for said shank and the terminals bent into trussing hooks that are disposed transversely of said shank.

6. A device for trussing poultry formed of a wire having its main portion constituting a shank and its end portions doubled back to form bearing ends for said shank and the terminals bent into trussing hooks that are disposed transversely of said shank, one of said doubled ends being formed into an eye.

7. A device for trussing poultry, comprising a shank having a plurality of transversely disposed trussing hooks projecting therefrom, and poultry-engaging means for holding the shank and hooks from turning rearwardly when engaged with a fowl.

8. A device for trussing poultry, comprising a shank having a plurality of transversely disposed trussing hooks projecting therefrom, the ends of said shank projecting beyond the hooks, and poultry-engaging means on one of said ends for holding the shank and hooks from turning rearwardly when engaged with a fowl.

9. A device for trussing poultry, comprising a wire constituting a shank and having its ends doubled backwardly and coiled about the shank between the ends thereof, the terminals of said wire being formed into hooks having their bases extending in one direction from the shank and their bills extending in the opposite direction across the shank in spaced relation thereto, and poultry-engaging holding hooks mounted on one end of the shank.

In testimony whereof, I affix my signature.

JAMES M. SELDEN.